Patented May 7, 1929.

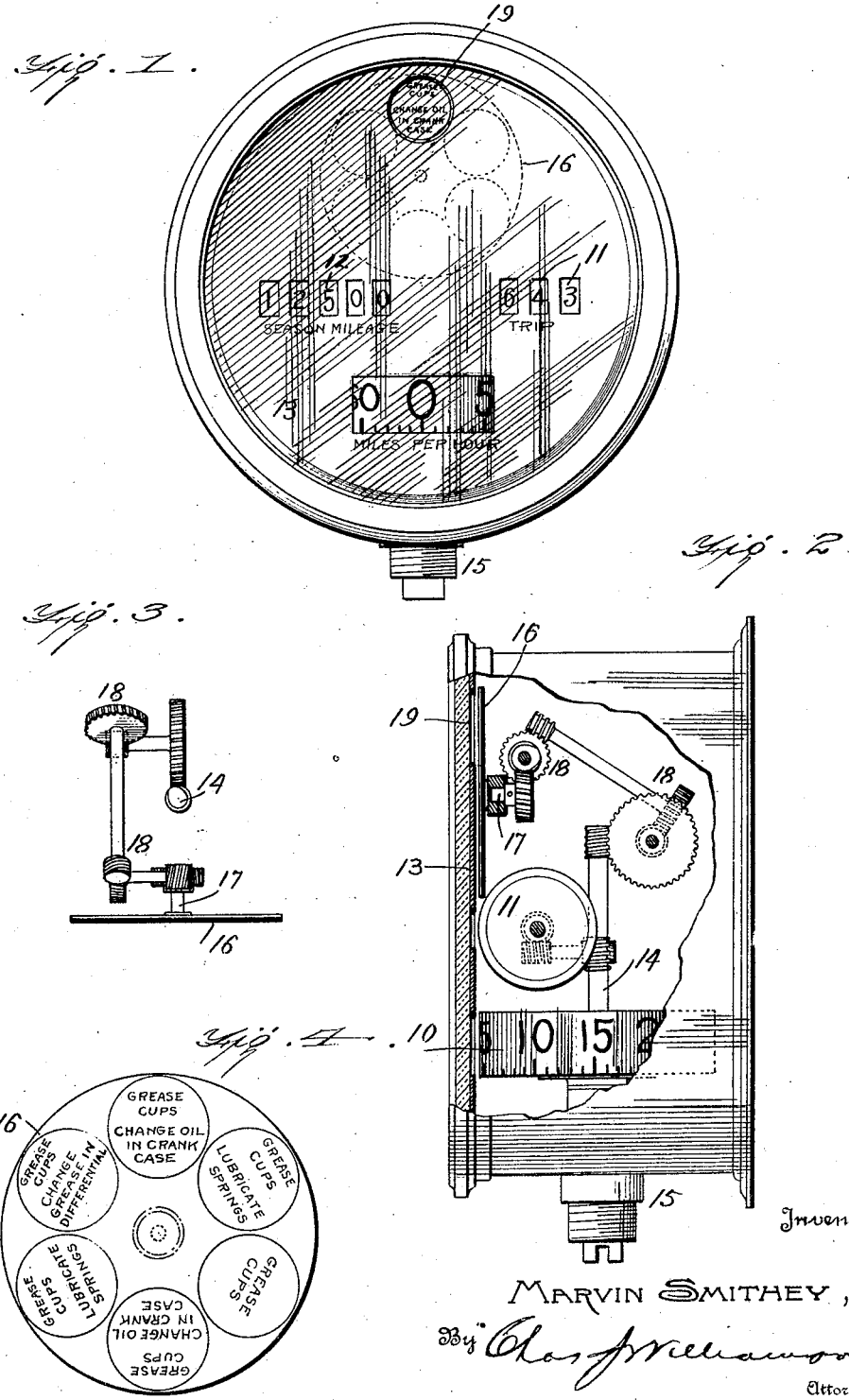

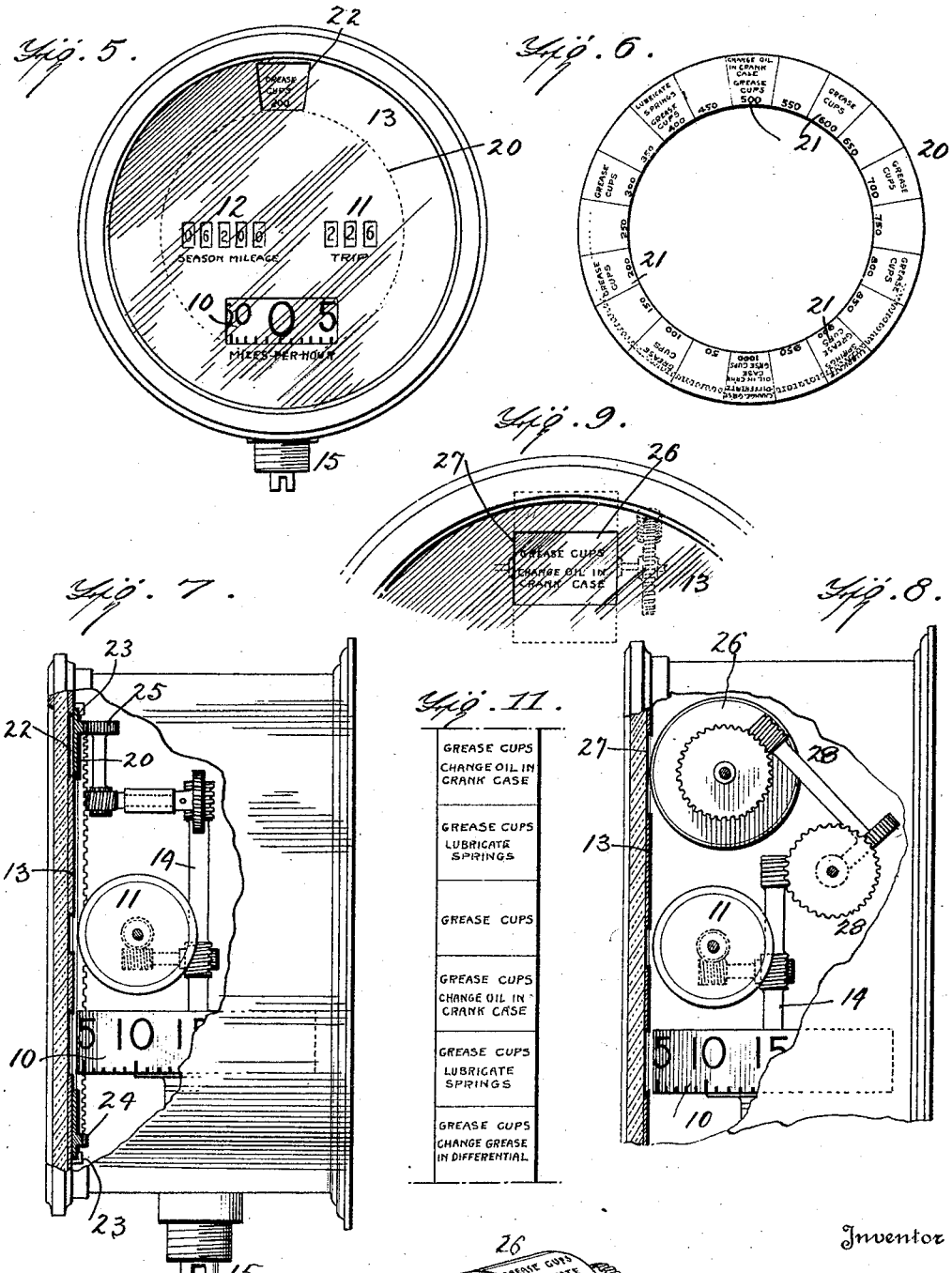

1,711,700

UNITED STATES PATENT OFFICE.

MARVIN SMITHEY, OF LAWRENCEVILLE, VIRGINIA, ASSIGNOR TO L. P. SMITHEY AND NELLIE C. SMITHEY, BOTH OF ROANOKE, VIRGINIA.

MOTOR-VEHICLE REGISTER.

Application filed July 14, 1920. Serial No. 396,173.

My invention relates to distance measuring and registering devices for use with motor vehicles for the purpose of enabling the owner or user to keep track of the performance of the car in respect of its various members that are subjected to wear so that he may know whether he is getting proper service from his car and may be apprised by timely notice that he must give attention to such parts of the car as need periodical looking after in order that the performance thereof shall be up to the maximum capacity. My invention consists in the mechanism having the construction substantially as hereinafter specified by or included within the scope or language of the appended claims.

In the accompanying drawings:

Fig. 1 is a face or front view of a speedometer embodying my invention;

Fig. 2 is a side elevation partly in section;

Fig. 3 is a detail plan view of the indicator gearing thereof;

Fig. 4 is a front view of the indicator dial of said mechanism;

Fig. 5 is a front elevation of another embodiment of my invention;

Fig. 6 is a detail face view of the dial employed in the construction shown in Fig. 5;

Fig. 7 is a view in side elevation and partly in section of the embodiment of my invention shown in Fig. 5;

Fig. 8 is a similar view of another embodiment of my invention;

Fig. 9 is a detail front view of a portion of the device shown in Fig. 8;

Fig. 10 is a detail perspective view of the drum form dial, such as is shown in Fig. 8;

Fig. 11 is a plan view showing the drum dial layout.

The ordinary motor-vehicle speedometer comprises a speed indicator and trip and season mileage odometers all of which are connected to a common shaft with some rotating member of the car so as to show the speed and mileage thereof. My invention comprehends, or involves the use, with such an instrument of a signal device that will automatically give warning or notice that some act that requires human intervention shall be done to or for the motor, or some other part or member of the car, such as lubrication, or the replenishment of materials that are consumed at a substantially regular rate related to the mileage of the car, and in particular, my invention has in view that operation of the signal member independently of the odometer mechanism, but in association therewith so that no extra burden will fall on the parts thereof, and so that its own operation will not be affected even if said odometer gets out of order.

Referring to the drawings in detail, the speedometer shown in the several figures, is of a well-known type comprising a speed indicating drum, 10, and trip and season mileage odometers, 11 and 12, respectively, a dial 13, with suitable display openings, and a shaft, 14, with a coupling, 15, for connection with one end of the usual flexible shaft (not shown) by which motion is taken from one of the car wheels.

From the shaft, 14, a direct connection is made with the signal device (which, in each of the forms of my invention shown in the drawings, is a rotary member) so that tho driven in unison with the odometers, and from the same source, the power to operate it does not come thru the odometers, or either of them.

In the form of my invention shown in Figs. 1 to 4, the signal member is a flat disk, 16, mounted on a shaft, 17, which by a train of reducing gearing, 18, is geared to the shaft, 14. On its face the disk bears a series of legends each of which calls attention to some matter, such as lubrication that should be attended to when the car mileage is such that the legend appears opposite the display opening, 19, in the dial, 13.

In the embodiment of my invention shown in Figs. 5 to 7, the signal member is in the form of a flat, thin ring or annulus, 20, that has the desired legends marked on radial subdivisions, 21, on its face, and in addition thereto it has numerals to indicate mileage so that it serves as a mileage indicator. The ring, 20, lies close to the dial, on the inside, and the legends are displayed, in turn, thru a hole, 22, in the dial. The ring is supported, as by overhanging lugs, 23, at intervals, that allow it to turn freely, and on its inner side it has a crown gear, 24, with which meshes a pinion, 25, that forms part of reducing gearing for driving it from the shaft, 14.

In the form of my invention shown in Figs. 8 to 10, the signal member is a drum, 26, that carries on its periphery the desired indicia of acts to be done, which are displayed thru a hole, 27, in the speedometer dial. A train of reducing gears, 28, connects the drum with the power shaft, 14, so that as in all the other cases shown, the signal member is rotated in accordance with the mileage traveled by the vehicle, and in unison with but independently of the trip and season odometers.

What I claim is:

1. An indicating device for motor vehicles comprising a casing, a vehicle actuated odometer mounted in a fixed position within the casing, said casing having a face plate with a display opening for the odometer, a movable indicator separate from the odometer mounted within the casing and having its own display opening and provided with indicia that refer to matters in relation to the vehicle that require attention, the same indicia being movable by the indicator to and from such display opening, and vehicle actuated means for moving such indicator in unison with but independently of the odometer and presenting indicia at the display opening for such indicator concurrently with the exhibition at the odometer display opening of a mileage pertinent to the displayed indicia.

2. An indicating device as in claim 1 in which the movable indicator is rotatable and has the indicia carried by an endless curved surface.

3. An indicating device for motor vehicles comprising a casing, an odometer mounted in a fixed position within the casing, said casing having a face plate with a display opening for the odometer, a movable indicator separate from the odometer and mounted within the casing and having its own display opening and provided with indicia that refer to matters in relation to vehicles that require attention, the same indicia being movable by the indicator to and from display opening, a shaft mounted within the casing and adapted to be connected with some rotating part of the vehicle to receive motion therefrom and separate gear connections between said shaft and the odometer and said movable indicator, whereby odometer and indicator move in unison but the indicator is moved independently of the odometer.

4. An indicating device for motor vehicles comprising a casing, an odometer mounted in a fixed position within the casing said casing having a face plate with a display opening for the odometer, a movable indicator separate from the odometer and mounted within the casing above the odometer and having its own display opening and provided with indicia with reference to matter in relation to vehicles that require attention, the same indicia being movable by the indicator to and from the display opening, a shaft extending from the bottom of the casing upward and adapted to be connected with some rotating part of the vehicle to receive motion therefrom, a gear connection between said shaft and the odometer and a separate gear connection between said shaft and said movable indicator, whereby odometer and indicator move in unison, but the indicator is moved directly from the shaft independently of the odometer.

In testimony whereof I hereunto affix my signature.

MARVIN SMITHEY.